Figure 1:
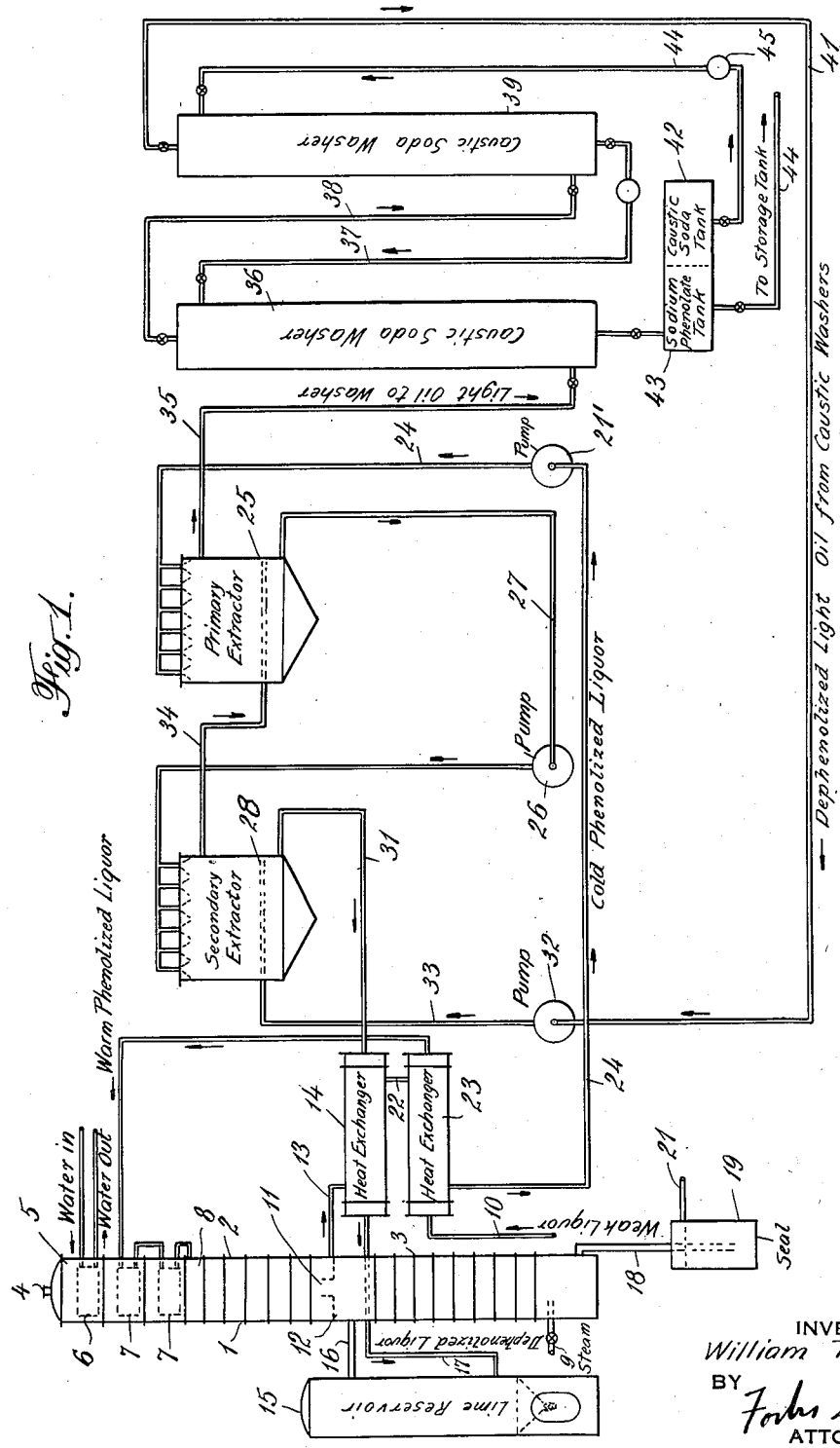

Patented Jan. 29, 1935

1,989,177

UNITED STATES PATENT OFFICE 1,989,177

PROCESS FOR THE RECOVERY OF PHENOLS FROM GAS LIQUORS

William Tiddy, Scarsdale, N. Y., assignor to Semet-Solvay Engineering Corporation, New York, N. Y., a corporation of New York Application May 20, 1931, Serial No. 538,738

4 Claims. (Cl. 260—154)

This invention relates to a process for treating liquid to remove organic compounds therefrom, and more particularly to the removal and recovery of tar acids, such as phenols, from weak liquors of coke ovens and gas works.

One object of this invention is to provide a process for recovering, economically and efficiently, substantially all of the phenols from gas liquors containing same.

Another object of this invention is to condition gas liquors which, in addition to phenols, contain carbon dioxide, hydrogen sulfide, and ammonia both in the free and fixed form, so as to remove constituents which react with the reagents utilized in accomplishing the removal of phenols prior to treating such liquors to remove phenols therefrom, and hence, conserve the phenol removing reagents which otherwise would be lost to the system.

The present invention is directed to a process for recovering organic compounds, such as tar acids, from waste and gas liquors and involves, first, removing components from the liquor, such as free ammonia, hydrogen sulfide, and carbon dioxide, and thereafter contacting the liquor with a suitable extracting agent, as for example, light oil, neutral tar oils or benzol, reconditioning the extracting agent by means of an alkali or other treatment and recovering the fixed ammonia from the phenol-free liquor by treating this liquor with lime or other alkaline material followed by a distillation step.

Weak liquors from coke ovens and gas works contain, among other constituents, a considerable amount of carbon dioxide, hydrogen sulfide, and free and fixed ammonia, together with varying percentages of phenols. It has been proposed to remove the phenols from such liquors by extracting them with light oil or other extracting agents, such as benzol, thereafter reconditioning the extracting medium by a caustic or other alkali treatment and recovering the phenols by acidifying the alkali phenolate separated from the extracting medium. Waste liquors have been treated in this manner prior to the steam distillation thereof to recover free and fixed ammonia contained therein. The treatment of such liquors before distillation for the recovery of ammonia has the advantage that it materially reduces the amount of liquors to be treated, since the liquors coming from the ammonia still are much greater in amount due to the addition of moisture by condensation of steam within the still. Further, the liquors coming from the still contain lime added thereto in the lime leg, which reacts with the phenols to form calcium phenolates. I have found that phenols from the ammonia still cannot be efficiently extracted, presumably due to the lime treatment of the liquor in the fixed leg of the still to liberate ammonia.

In the extraction of the liquors, the extracting medium, in addition to absorbing the phenols, also takes up a considerable portion of the carbon dioxide, hydrogen sulfide, and other impurities soluble in the extracting medium, present in the liquor. Upon subsequent treatment of the phenol-extracting agent with caustic, the hydrogen sulfide, carbon dioxide, and other impurities, taken up by the extracting agent, react with the caustic, consequently materially increasing the amount of caustic necessary for the practice of the process.

In the usual process of treating gas liquor, the liquid is introduced cold into the top of the ammonia still and passed down therethrough, substantially all of the free ammonia being driven off in its passage through the free leg of the still. The liquor is then passed into the lower part of the still where it comes into contact with lime in what is known as the "lime leg". The lime frees any ammonia which may be present in combined form. The liquor containing this free ammonia is then passed into the fixed leg of the still where the ammonia is driven off, passing up into the free leg of the still. The ammonia from the still may be passed into distilled water, where it is absorbed and produces aqua ammonia solution. If ammonium sulfate or other salt is desired, the ammonia gas is passed through a saturator containing sulfuric or other acid to form the desired salt.

If phenols have not been removed from the gas liquor before treatment to recover ammonia, the waste liquor coming from the bottom of the still will contain substantial quantities of phenol. In view of the phenol content of such waste liquor, the discharge thereof into streams would be destructive to the flora and fauna contained therein.

In accordance with the preferred embodiment of the present invention, the weak liquors containing phenols and other constituents, such as the liquors from coke oven plants or gas works, are first preheated and then introduced into the free ammonia still, wherein the free ammonia, carbon dioxide, and hydrogen sulfide are removed. The temperature of the vapors coming off from the top of the still is preferably maintained within a range of from 93° to 98° C., and preferably at a temperature of approximately 95° C. The top of the still is continuously cooled by the circulation of liquid therethrough and the introduction of ammoniacal liquor therein. Operating in this manner, substantially all carbon dioxide and hydrogen sulfide, as well as free ammonia, are removed from the liquor, while the phenol remains therein. The liquor containing phenol from this distillation treatment leaving the still at a temperature of approximately 105° C. is then cooled to a temperature of from 20° to 65° C., preferably by heat interchange with the liquor fed to the ammonia still. Thereafter the cooled liquor is extracted with a suitable phenol absorbing medium, such as light oil. In accordance with one form of this invention, the extraction of phenols is accomplished by vigorously mixing the light oil or other absorbing medium with liquor, preferably by means of centrifugal pumps, and thereafter passing the resultant mixture into decanters where the liquid is separated from the oil. Instead of centrifugal pump extraction of the phenols by means of light oil, above briefly described, the light oil and liquor may pass in continuous counter-current flow through suitable extracting towers.

The phenol-free liquor, preferably heated by passage in heat interchange relation with the hot waste liquors coming from the free ammonia still, is then passed into the lime leg or reservoir of the ammonia still, the fixed ammonia contained in the liquor reacting with the milk of lime therein, thus liberating ammonia which is removed by distilling the liquor in the fixed leg of the ammonia still. The waste liquor from the fixed leg of the ammonia still, it will be noted, contains substantially no phenols and may be disposed of conveniently.

The light oil or other extracting medium may be processed in the usual manner to recover phenols therefrom, as for example, by treatment with caustic in a scrubbing tower and thereafter re-used to extract additional phenols from the free ammonia, carbon dioxide, and hydrogen sulfide free liquor. The sodium phenolate formed in the caustic tower may be concentrated and sold as such or may be acidified to form phenols which are purified in any well known manner and constitute a valuable by-product of this process.

The light oil used in the practice of this invention may be the unrefined oil obtained at the coke oven plant by treating the gas distillate with a suitable absorbing medium, such as straw oil, and thereafter distilling the resultant benzolyzed oil to obtain the crude light oil containing benzol, toluol, xylol, a small fraction of unsaturated compounds, i. e., olefines, and other constituents.

Figure 2:
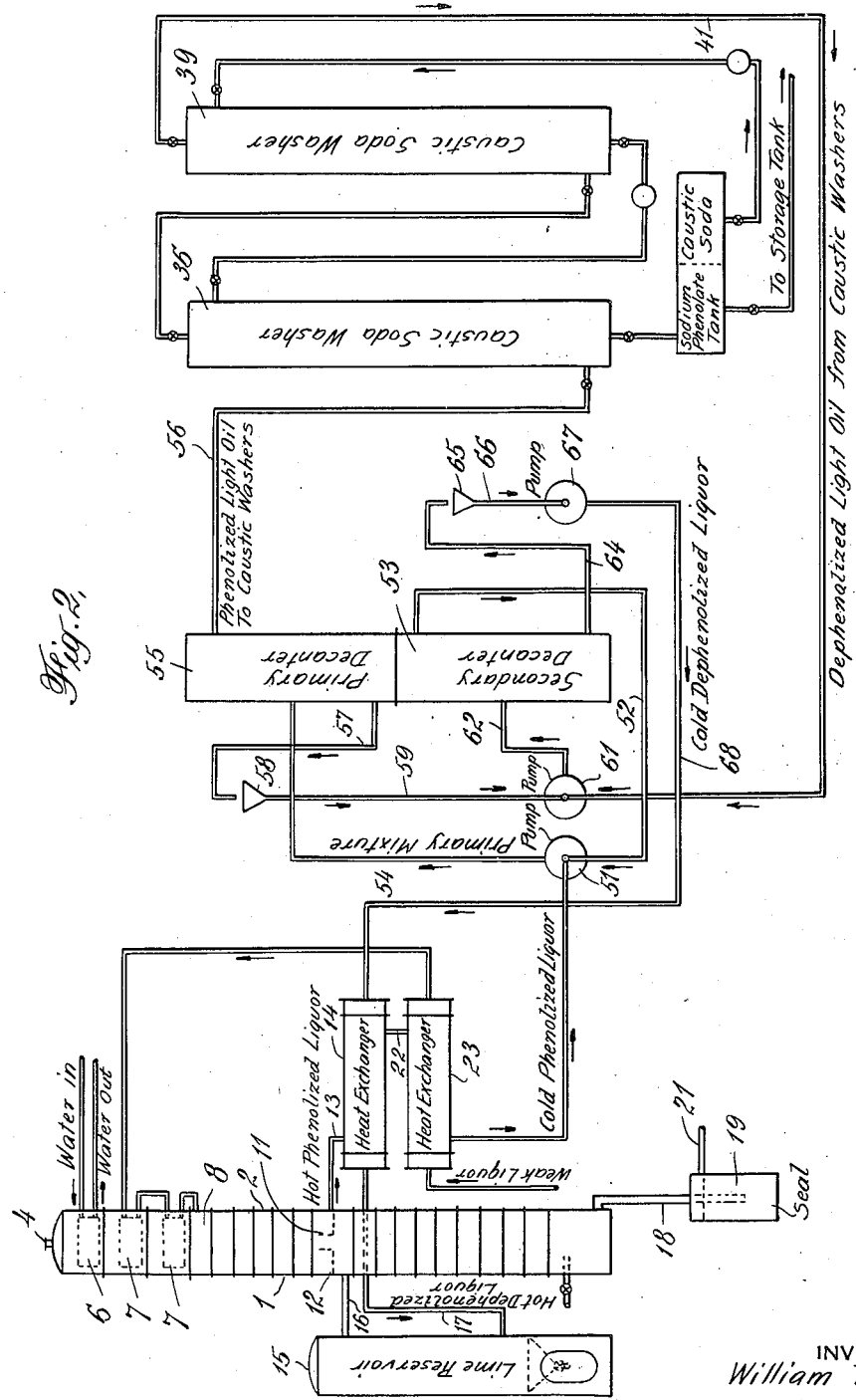

In the accompanying drawings, Fig. 1 illustrates a layout of apparatus adapted to carry out the process herein described, the extraction of phenols from waste liquors, in the showing of this figure, being accomplished by extractors or absorbers through which the liquor and extracting medium flow in counter-current direction; and Fig. 2 illustrates a modification of this invention, the modification chiefly involving the substitution of a centrifugal pump apparatus for extracting the phenols from waste liquors for the counter-current scrubber apparatus of Fig. 1.

Referring to Fig. 1 of the drawings, reference numeral 1 indicates an ammonia still composed of a free leg 2, superposed on a fixed leg 3. Free leg 2 is provided, at its top, with a vapor outlet 4 which leads to the ammonia recovery system (not shown). The still, as customary, is divided into a plurality of sections, the base of each of which is provided with dephelgmating plates and hoods, permitting flow of vapors up through the still and the downward flow of reflux liquid and condensate, the vapors in passing up through the still, bubbling through the condensate on the dephlegmating plates. The top section 5 of the still is provided with a cooling coil 6 through which water or other liquid may be circulated to control the temperatures of the vapors leaving the still. Below the top section 2, two sets of coils 7 are provided through which weak liquor to be treated passes into section 8 of the free leg of the still. The weak liquor introduced through pipe 10 is preheated first by passage through heat exchanger 23 where it passes in indirect heat exchange relation with the relatively hot liquor from the base of free leg 2. This liquor is further preheated in its passage through the coils 7, where at the same time this liquor serves to cool the vapors passing up through the still.

Steam is supplied to the still through valve controlled pipe 9 disposed in the base of the fixed leg 3, the steam and vapors removed from the liquor in the fixed leg rising through opening 11 in the base plate 12 of the free leg 2 and commingling with the vapors flowing through the free leg as will be more fully explained hereinafter.

From the coils 7, the weak liquor is discharged onto the dephlegmating plates, flowing down through the free leg, in direct heat exchange relation with the vapors and steam flowing up through the still, the lower boiling components, such as hydrogen sulfide, carbon dioxide, and free ammonia, being released from the liquor and passing up through the still, leaving it through the vapor outlet 4. Finally, the weak liquors from which substantially all the carbon dioxide, hydrogen sulfide, and free ammonia have been removed, reach the base plate 12, from which they pass through pipe 13 into the heat exchanger 14.

The fixed leg 3 of the still is also built up of the usual dephlegmating plate and hood construction. Positioned adjacent the leg 3 is a usual lime leg or reservoir 15, which is connected thereto by pipe 16, arranged to discharge the lime treated liquor into substantially the top of the fixed leg 3. Dephenolized liquor, i. e., liquor from which the phenols have been removed, is fed from the heat interchanger 14 through pipe 17 into the base of the lime leg 15 and passes up therethrough into and through pipe 16. From this pipe, the dephenolized liquor flows down through the fixed leg in counter-current direction to the flow of steam supplied through valve-controlled pipe 9. Steam, ammonia, and vapors, driven off from the lime-treated liquor, pass up through leg 3 into and through opening 11 into and through leg 2, as hereinabove described. The ammonia-free liquor leaves the base of the leg 3 through conduit 18 and passes into seal 19, provided with a discharge pipe 21.

The liquor from the free leg 2 of the still, containing fixed ammonia and phenol, but from which carbon dioxide, hydrogen sulfide and free ammonia has been removed, termed "phenolized liquor" on the drawings, is pumped by means of pump 21 through heat interchanger 14, pipe 22, heat interchanger 23, pipe 24, into the top of primary extractor 25. Pump 21' forces the phenolized liquor through a series of sprays disposed above the level of the extracting medium in the tower 25 so that the liquid, in spray form, contacts with the extracting medium over substantially the entire surface thereof. The liquor passes down through the extracting agent in extractor 25 and is pumped therefrom by pump 26, through pipe 27, into the top of secondary extractor 28, which, preferably, is of like construction and design as that of extractor 25. From the extractor 28, the liquor, from which substantially all the phenols have been removed, i. e., the dephenolized liquor, flows, preferably by gravity, through pipe 31 into and through heat exchanger 14, pipe 17, into the lime leg or reservoir 15. In the heat exchanger 14, the cold dephenolized liquor passes in indirect heat interchange relation with the hot phenolized liquor, coming from the free leg 2 of the still 1. As hereinabove described, lime-treated liquor passes from the lime leg 15 into the fixed leg 3 of the still where the ammonia, liberated by the lime treatment, is removed. The ammonia-free liquor is discharged from the base of the still through discharge pipe 18 into seal 19, from which it flows through pipe 21, connected to a waste line or suitable point of disposal.

Purified light oil, that is, oil containing substantially no phenols, or other extracting medium is pumped by means of pump 32, through pipe 33 into the secondary extractor 28, rising up through the body of liquor contained therein. The volume of light oil passed through each extractor is preferably 1.25 times that of the liquor. The extracting medium is preferably introduced at a point in the extractor above the level of the liquor, occurring at the base of the extractor, separated from the mixture of oil and liquor. The absorbing or extracting medium rises through the extractor 28, removing the major portion of the phenols from the liquor passed therethrough and then passes out through pipe 34 into the primary extractor 25. Here the absorbing medium, containing phenols absorbed in secondary extractor 28, contacts with the incoming liquor containing maximum amounts of phenols introduced into the primary extractor 25, through pipe line 24 by pump 21', the extracting oil entering the extractor 25 at a level above the layer of liquor in the base of this extractor rising up through the liquor therein and leaving the extractor 25 through pipe line 35. From 75 to 85% of the phenols are removed in the primary extractor and substantially the remainder of the phenols removed in the secondary extractor 28.

Pipe line 35 leads to the base of a caustic soda washer 36. The phenolized light oil rises through the body of caustic in washer 36, continuously leaves this washer through pipe 38 connected to the base of a second caustic washer 39, and rises up through the body of caustic therein. The caustic solution reacts with the phenols in the light oil to form sodium phenolate, which separates from the oil and remains in the caustic solution. The pump 32 forces the dephenolized light oil from the caustic washer 39 through pipe line 41, into the secondary extractor 28, as hereinabove described. The caustic solution originally introduced into the washers 36 and 37 contains about 25% by weight of caustic.

When it is desired to replace the caustic in tower 39, the caustic solution is discharged therefrom and fresh caustic solution is pumped from tank 42, by means of pump 45 through pipe line 44, which leads into the top of the washer 39. If desired, the partially used up caustic solution in tower 39 may be pumped therefrom through pipe 37 into the caustic soda washer 36. It will be understood, of course, that washers 36 and 39 and associated pipe lines are provided with suitable valves to permit simultaneous continuous use of either or both towers and to shut off one of the washers from the system to permit the other to operate when it is desired to replace the caustic therein.

When the caustic in the tower 36 has completely reacted with the phenols to form sodium phenolate, it may be discharged therefrom into storage tank 43, from which the sodium phenolate may be withdrawn through pipe line 44 for purification or concentration treatment.

The structure and operation of the ammonia still, heat exchangers and caustic soda washers of Fig. 2 are the same as the corresponding elements of Fig. 1. Accordingly, the corresponding elements of these two figures have been given the same reference numerals. A description of the parts of Fig. 2 which have already been described in connection with the apparatus of Fig. 1, is considered unnecessary.

The chief distinction between the modification of Fig. 2 and that of Fig. 1 resides in the means for accomplishing the removal of phenols from the liquors coming from the free leg of the still from which liquors carbon dioxide, hydrogen sulfide, and free ammonia have been removed. In accordance with the embodiment of the invention shown in Fig. 2, the cold phenolized liquor from the heat exchanger 23 is passed into a centrifugal pump 51 of any well-known design and which is preferably operated below its capacity. In this pump, the phenolized liquor is contacted and vigorously agitated with light oil or other extracting medium introduced thereinto through pipe line 52, leading from the top of secondary decanter 53. The resultant mixture is continuously pumped, by means of pump 51, through pipe line 54 into the primary decanter 55.

The partially phenolized light oil and liquor stratify into two layers in primary decanter 55, the light oil layer, the upper layer, passing through pipe line 56 into the caustic soda washer 36. The liquor layer in primary decanter 55 is pumped or otherwise withdrawn from the base of this decanter through pipe line 57, which discharges into overflow device 58 of pipe 59 communicating with a second centrifugal pump 61. Purified or dephenolized light oil from the caustic soda washer 39 is passed through pipe line 41 into the pump 61 where the dephenolized light oil and the liquor, from which the major portion of the phenols has been removed in the preceding pumping and decanting operation, are vigorously agitated and admixed and discharged by the pump 61 through pipe line 62 into the secondary decanter 53. In this decanter the light oil or other absorbing medium and liquor stratify. The lower dephenolized liquor layer passes through line 64, leading from the base of the decanter into the overflow device 65 communicating with pipe line 66, which leads to the pump 67. The relatively cold dephenolized liquor is pumped by means of pump 67 through pipe line 68 into the heat exchanger 14 where it passes in indirect heat exchange relation with hot phenolized liquor from the free leg 2 of the still 1. From the heat exchanger 14, as above described, the partially preheated dephenolized liquor is passed into the lime leg or reservoir 15. Preferably the light oil is introduced into the pumps in amount equal to about 1.25 times the volume of liquor.

The upper light oil layer containing the phenols removed in the secondary decanter 53, as hereinabove described, passes through pipe 52 into the centrifugal pump 51.

One example of operating conditions maintainable in the practice of this process, to which it will be understood this invention is not confined, is as follows:

100,000 gallons of weak ammonia liquor at a temperature of approximately 30° C. enters heat exchanger 23 and leaves this exchanger and enters dephlegmator coil 7 at a temperature of approximately 40° C. The liquor leaves the coil 7 and enters the free leg of the ammonia still at a temperature of approximately 90° C. In the free leg of the still, the carbon dioxide and hydrogen sulfide are removed from the liquor, which leaves the still at a temperature of approximately 102° C., and at this temperature enters heat exchanger 14. In passing through the free leg of the ammonia still, the liquor is augmented by condensation of steam and other vapors by approximately 12,000 gallons. The liquors leave the exchanger 14 at a temperature of approximately 50° C., enter heat exchanger 23, and leave this exchanger at a temperature of approximately 40° C. At this temperature the liquor is introduced into the extractors in which no substantial change in temperature takes place. The light oil extracting medium at a temperature of 40° C. is introduced into, and the dephenolized liquor and phenolized light oil withdrawn from, the extractors at a temperature of 40° C. 140,000 gallons of light oil are used to treat the 112,000 gallons of liquor in the extractors. From the extractors, the liquor passes through heat exchanger 14 and enters the lime reservoir at a temperature of approximately 90° C.

Analyses of the liquor and light oil are as follows:

The weak liquor entering the free leg of the ammonia still contains 3.6 grams of phenol, 2.7 grams of hydrogen sulfide, and 4.1 grams of carbon dioxide per liter of liquor. The liquor leaving the free leg of the still and entering the extractor contains 3.2 grams of phenol, 0.07 grams of hydrogen sulfide, and 0.88 grams of carbon dioxide per liter of liquor. The dephenolized liquor leaivng the extractors contains 0.16 grams of phenol, 0.067 grams of hydrogen sulfide, and 0.88 grams of carbon dioxide per liter of liquor.

The light oil entering the secondary extractor where it initially contacts with the weak liquor contains 0.20 grams of phenol per liter of liquor, and no hydrogen sulfide or carbon dioxide. Upon leaving the extractors, the light oil contains 2.63 grams of phenol, 0.0024 grams of hydrogen sulfide, and 0.0008 grams of carbon dioxide per liter of liquor.

Thus, in accordance with this invention, a phenol recovery of 95% based on the total phenol content of the liquor is obtainable. Further, the process results in a saving of 235.2 pounds of sodium hydroxide per 100,000 gallons of weak liquor, since if the weak liquor is not treated in accordance with this invention, the light oil leaving the extractor would contain 0.08 grams of hydrogen sulfide, and 0.024 grams of carbon dioxide per liter of liquor which would react with 242 pounds of sodium hydroxide per 100,000 gallons of weak liquor. Due to the preliminary distillation of the liquor in the free leg of the ammonia still, hereinabove described, the hydrogen sulfide and carbon dioxide contents of the light oil, as above indicated, are reduced to 0.0024 and 0.0008 grams, respectively, per liter of liquor, which react with only 6.8 pounds of sodium hydroxide per 100,000 gallons of liquor. The difference between 242 and 6.8 pounds represents the saving of caustic per 100,000 gallons of weak liquor effected by the process of this invention.

The centrifugal pump extracting apparatus preferably operates continuously, the liquor and light oil being continuously introduced thereinto, vigorously agitated by the blades of the pump, continuously discharged into substantially the mid portion of the decanter, the phenolized light oil being continuously withdrawn from the top and the partially or substantially totally dephenolized liquor, as the case may be, continuously withdrawn from the bottom of the decanter. Of course, if desired, the decanting operation may be performed in batches instead of continuously.

It will be noted that, in accordance with this invention, the carbon dioxide, hydrogen sulfide and free ammonia are removed from the gas liquor before phenols are extracted therefrom by means of an extracting medium, such as light oil. After extraction of phenols, the gas liquor is passed through the lime leg to liberate the fixed ammonia, which is recovered by distilling the lime treated liquor in the fixed leg of the still. The waste liquor from the fixed leg, it will be noted, is free of phenols, and consequently, may be readily disposed of as such into streams or other waste lines. Due to the removal of carbon dioxide and hydrogen sulfide before treatment of the liquor with light oil to remove phenols, carbon dioxide and hydrogen sulfide contained in the liquor are not taken up by the light oil and consequently, the amount of caustic necessary for treating the light oil to remove phenols therefrom is materially reduced. Further, due to the treatment of the liquor to remove phenol before treatment thereof with lime to liberate the fixed ammonia, the difficulties encountered in the treatment of the lime-treated gas liquors are obviated.

It will, of course, be understood that while specific embodiments of the invention have been described, various changes in the details thereof might be made by those skilled in the art and this invention is not to be limited to the disclosure herein, but only by the scope of the appended claims.

I claim:

1. The improvement in the process of extracting liquors containing phenols and other constituents which react with alkali, which process involves extracting the phenols from said liquors with an inert organic extracting medium and thereafter treating the extracting medium containing the phenols to form water soluble phenolates, said other constituents being soluble in the inert organic extracting medium, which comprises first removing said other constituents from the liquors while retaining the phenols therein, then extracting the liquors with said inert organic extracting medium to remove the phenols therefrom, and treating the phenolized extracting medium with alkaline material to recover the phenols contained in said extracting medium.

2. The process of recovering phenols from gas liquor containing phenols, hydrogen sulfide, carbon dioxide, and free ammonia, which comprises distilling the liquor at such temperature as to drive off substantially all of the hydrogen sulfide, carbon dioxide and free ammonia, while retaining the phenols, cooling the resultant liquor from the distillation treatment, extracting the cooled liquor with an inert organic solvent, thus removing the phenols therefrom, and treating the phenolized solvent with alkaline material to remove phenols therefrom.

3. The process of treating gas liquor containing phenols, hydrogen sulfide, carbon dioxide, and free and fixed ammonia and in which the fixed ammonia is recovered after the removal of phenols from the gas liquor, the steps which comprise distilling the liquor in a dephlegmator column while cooling the vapors leaving the column so that the temperature thereof does not exceed 98° C., thus driving off the free ammonia, hydrogen sulfide and carbon dioxide, while retaining the phenols in the liquor, cooling the resultant liquor from this distillation treatment, extracting the cooled liquor with an inert organic solvent to remove the phenols therefrom, and treating the phenolized extracting medium with caustic to recover the phenols.

4. The process of treating gas liquor containing phenols, hydrogen sulfide, carbon dioxide, and free and fixed ammonia and in which the fixed ammonia is recovered after the removal of the phenols from the gas liquor, the steps which comprise (1) passing the liquor through the free leg of an ammonia still, the top of which is cooled by circulating liquor therethrough so that the vapors leaving the still are at a temperature not exceeding 98° C., thus removing substantially all hydrogen sulfide, carbon dioxide and free ammonia from the liquor while retaining the phenols therein; (2) passing the hot liquor from the distillation operation of step 1 in heat exchange relation with liquor coming from step 3, thus cooling the liquor from step 1; (3) vigorously agitating partially phenolized light oil and liquor coming from step 2, separating the partially dephenolized liquor from the completely phenolized light oil, vigorously agitating the partially dephenolized liquor and purified light oil and separating the partially phenolized light oil from the dephenolized liquor; and (4) treating the completely phenolized light oil with caustic to form sodium phenolate, separating the sodium phenolate from the purified light oil and re-using the purified light oil.

WILLIAM TIDDY.